United States Patent
Lee et al.

(10) Patent No.: US 9,224,122 B2
(45) Date of Patent: Dec. 29, 2015

(54) OUTDOOR DEVICE MANAGEMENT SYSTEM

(71) Applicant: GENERAL LUMINAIRE CO., LTD., Taipei (TW)

(72) Inventors: Chien Lee, New Taipei (TW); Yung-Hong Wang, Taipei (TW)

( * ) Notice: Subject to any disclaimer, the term of this patent is extended or adjusted under 35 U.S.C. 154(b) by 545 days.

(21) Appl. No.: 13/684,584

(22) Filed: Nov. 26, 2012

(65) Prior Publication Data

US 2014/0149077 A1    May 29, 2014

(51) Int. Cl.
  *G06F 11/00* (2006.01)
  *G06Q 10/08* (2012.01)

(52) U.S. Cl.
  CPC .................... *G06Q 10/087* (2013.01)

(58) Field of Classification Search
  CPC ...... G08B 27/003; G06Q 10/083; H04W 4/02
  USPC .................. 702/184, 182, 183, 188
  See application file for complete search history.

(56) References Cited

U.S. PATENT DOCUMENTS

| | | | |
|---|---|---|---|
| 2003/0195820 A1* | 10/2003 | Silverbrook et al. | 705/26 |
| 2011/0117878 A1* | 5/2011 | Barash et al. | 455/404.2 |
| 2011/0275364 A1* | 11/2011 | Austin et al. | 455/423 |

FOREIGN PATENT DOCUMENTS

| | | |
|---|---|---|
| TW | M416928 | 11/2011 |
| TW | M424561 | 3/2012 |

* cited by examiner

*Primary Examiner* — Edward Raymond

(57) ABSTRACT

An outdoor device management system, in installations of at least one outdoor device such as a road lamp, a street trash can, an electrical box, a monitor, an electric meter or a sprinkler, uses a wireless sensor with a global positioning system (GPS) chip to sense an identification element of the outdoor device, capture a unique identifier address (UID) and generate sensed data containing coordinate data and then transmits the sensed data to a terminal device, labeling the outdoor device on a corresponding position in a map, and transmitting an operation instruction to trigger and control operations of the corresponding outdoor device. The outdoor device includes a detection element for detecting and reporting current operating status for the terminal device, using the map to plan an optimal path to expedite going to maintain the outdoor device when abnormality occurs so as to improve the convenience and accuracy of management.

8 Claims, 6 Drawing Sheets

OUTDOOR DEVICE MANAGEMENT SYSTEM

BACKGROUND OF THE INVENTION

1. Field of the Invention

The present invention relates to the technical field of a management system for data supervision, and more particularly to an outdoor device management system, which allows administrators to remotely monitor each outdoor device through its installation position, operation rules and operation conditions marked on a map, to achieve the effects of reducing cost and improving quality of management.

2. Description of the Related Art

With the progress of human civilization, the development, management and maintenance of various public facilities, including outdoor devices such as road lamps, street trash can, electrical boxes, monitors, camcorders, traffic lights, electric towers, electric meters, sprinklers or switch boxes, are being valued to perfect service quality of said facility for improving the quality of living and providing people a safe, comfortable and convenient living environment. The management of public facilities means not only repairing damage facilities but also requiring regular examinations on operation status of the facility and maintenance, thus a guarantee of operation quality of the public facilities can be made. In that way, the management described above undoubtedly spends tremendous manpower and expense. Further, the manual detections of the facilities distributed in districts definitely lower the efficiency of regular examinations and affect the quality of management.

Therefore, a road lamp with a wireless communication mechanism was disclosed in R.O.C. Pat. No. M416928 to support the aforementioned social development, wherein a built-in environment detection unit is provided for monitoring and automatically adjusting the ON and OFF time and the brightness of the road lamp, as well as noticing a terminal management server when an abnormal situation occurs, so as to let manager know about the abnormal situation and prepare for the necessary maintenance and repair. In the meantime, the road lamp is also used as a wireless communication base station to facilitate the construction of hot points for users to log on a wireless network in a city. Further, an outdoor electrical box monitoring device was disclosed in R.O.C. Pat. No. M424561, wherein a door of an electrical box identifies and records persons using the electrical box to enhance the management and control in order to prevent unauthorized persons to connect telephone lines for wiretapping, and the situations of the electrical box are detected and related data are collected to enhance the monitoring operation of the system. In the aforementioned prior arts, one or more of the functions including the detected recording of environment parameters, the report of errors, and the issuance of instructions for the operation at the terminal are provided in hope of improving the efficiency and the quality of management. However, if the devices are broken down or require repairs, the manager has to confirm the identity code of the equipment first, and then review the data to check the location of the device and plan for a route to go to the location wherein the problem occurs. If there are different types of abnormal devices, the planning of the route may take much time and incur a high management cost that may result in a low efficiency of troubleshooting, a poor service quality, and a drop of user satisfaction.

In view of the aforementioned problems, it is a main subject of the present invention to provide a management system that integrates map information and monitors and analyzes data of current situation, so as to reduce the rate of abnormality by maintaining and repairing related devices in advance and improve the poor operation efficiency. Therefore, the invention can improve the service quality of the devices and facilities. In addition, the invention automatically plans an optimal route upon the receipt of an abnormal alarm to shorten the time required by the manager to go to the location for troubleshooting the abnormal device and lower the cost of management.

SUMMARY OF THE INVENTION

Therefore, it is a primary objective of the present invention to overcome the problems of the prior art by providing an outdoor device management system with a map function to achieve the effects of instantly monitoring the operation situation of the outdoor device, providing an optimal path when an abnormal situation occurs, shortening the time required by the manager to go to the location for maintenance and repair, and improving the service quality.

To achieve the aforementioned objective, the present invention provides an outdoor device management system applied for monitoring at least one outdoor device such as a road lamp, a street trash can, an electrical box, a monitor, an electric meter or a sprinkler by a terminal device to improve the convenience and accuracy of monitoring, characterized in that the outdoor device comprises an identification element and a transmission element; the outdoor device management system senses the outdoor device by a wireless sensor with a global positioning system (GPS) chip, captures a unique identifier address (UID) of the identification element to form sensed data and then transmits the sensed data to the terminal device; the terminal device analyzes the sensed data packed with coordinate data to mark the outdoor device on a corresponding position in a map based on the coordinate data, and transmits an operation instruction to the corresponding outdoor device based on the UID to trigger the outdoor device through the transmission element for operation control; the outdoor device further comprises a detection element for detecting current status to form a detected value containing the UID and then transmits the detected value to the terminal device via a wireless network by the transmission element; analyzing and finding the detected value is abnormal, the terminal device uses the map to plan an optimal path for expediting the process of going to the location to maintain the outdoor device.

Wherein, the identification element is a 2D barcode or a 3D barcode, and the sensor is a camera or a camera phone with a global positioning function, and the UID includes model number, service life and manufacturer data of the outdoor device. If plural outdoor devices are used, the terminal device divides each of the outdoor devices into a group and defines the operation instruction corresponding to each group to control a start time, an end time and an operation method of the outdoor devices, so as to facilitate the outdoor devices to manage an area or provide the same operation, as well as planning a management system of the outdoor devices easily to control the current situation of the devices correctly.

In addition, the detected value includes one or more data selected from the collection of temperature, current, voltage, working time and full storage rate of outdoor device. The sensor instantly transmits the sensed data to the terminal device via a wireless network, or the sensor includes a memory device for storing the sensed data. In an offline mode, a transmission line is provided for transmitting the sensed data to the terminal device, so that the terminal device can output a warning signal to notice a manager immediately to expedite the troubleshooting process, when an abnormal detected value occurs.

In summation of the description above, the present invention adopts a handheld sensor to identify the latitude and longitude of the installed device during the installation process of the outdoor device, and uses the terminal device to integrate and label the installed device on a map for facilitating managers to monitor the installed device and control the schedule of installation process and the installed position of each device. In addition, the terminal device monitors the current operating situation of the outdoor device through the detection element instantly to achieve the effects of expediting the troubleshooting process, reducing the management cost, improving the management quality, and enhancing the service quality and user satisfaction of the outdoor public facilities.

DETAILED DESCRIPTION OF THE PREFERRED EMBODIMENTS

Figure 1:
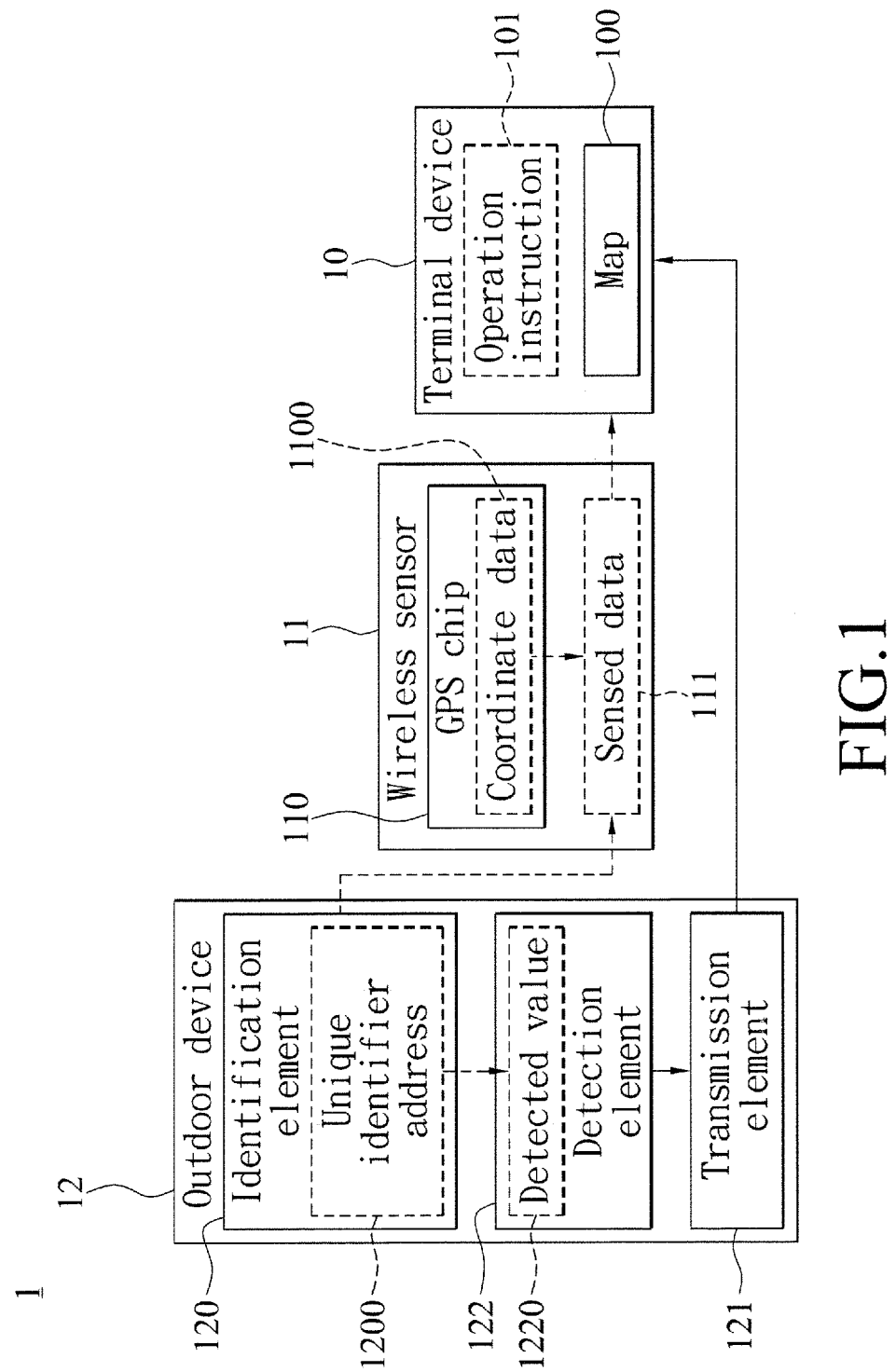
FIG. 1 is a block diagram of a preferred embodiment of the present invention.
Figure 2:
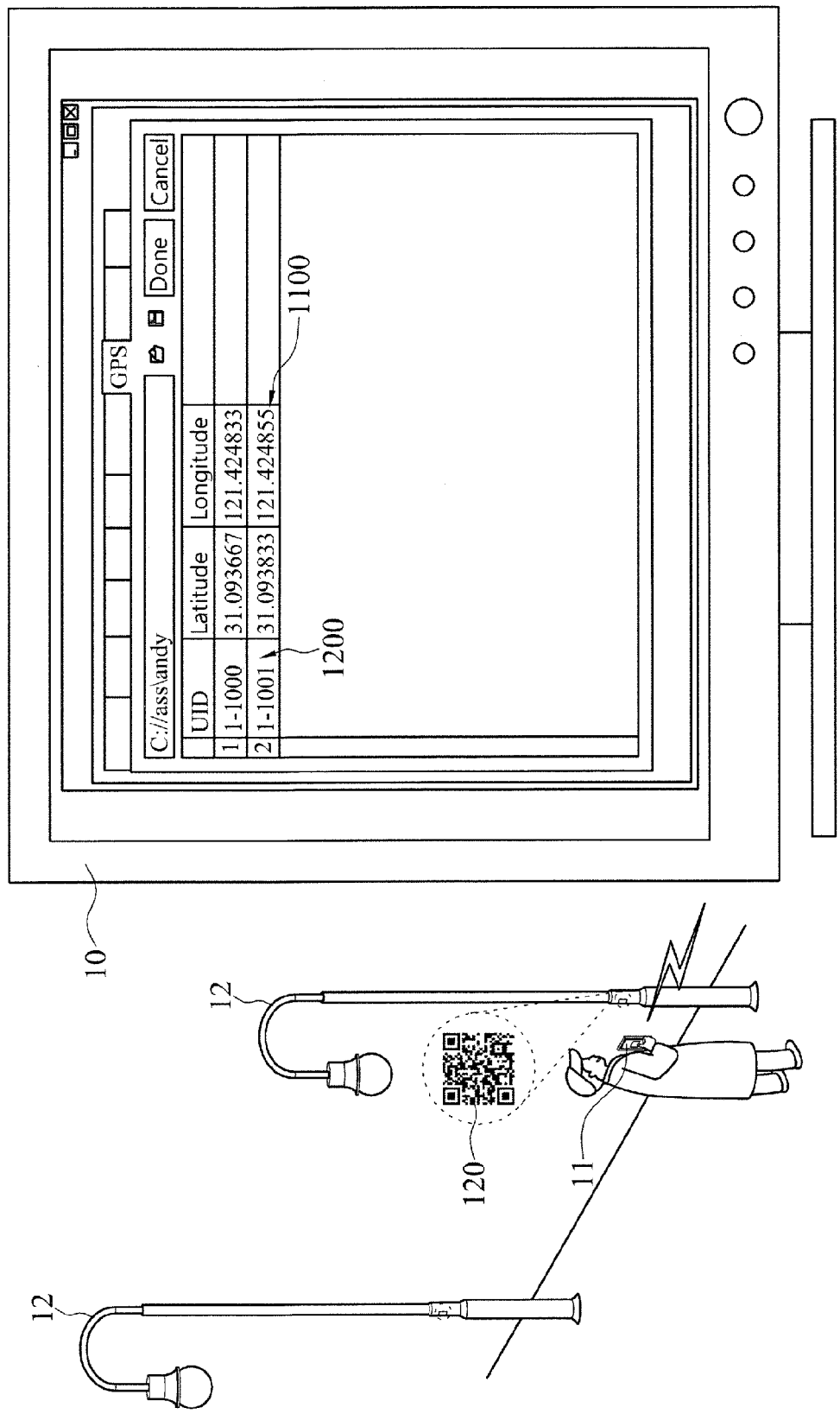
FIG. 2 is a schematic view of application in accordance with the first preferred embodiment of the present invention.
Figure 3:
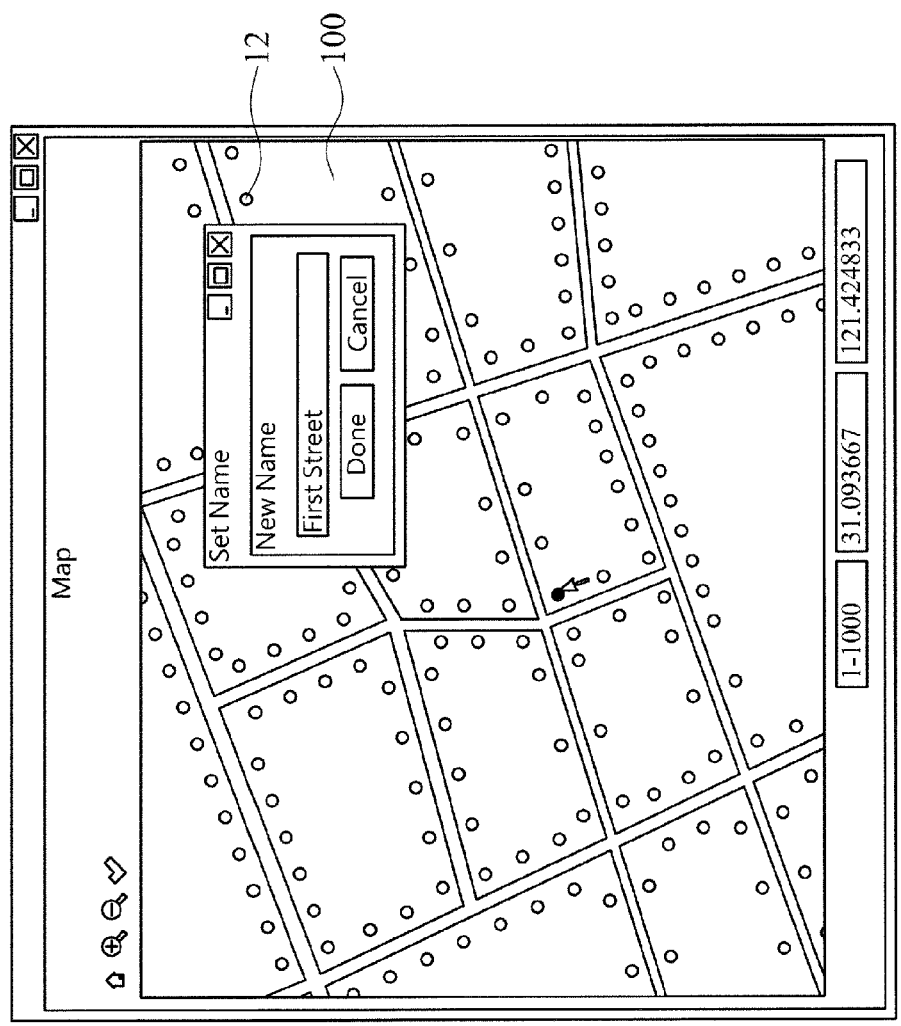
FIG. 3 is a schematic view of interface in accordance with the first preferred embodiment of the present invention.
Figure 4:
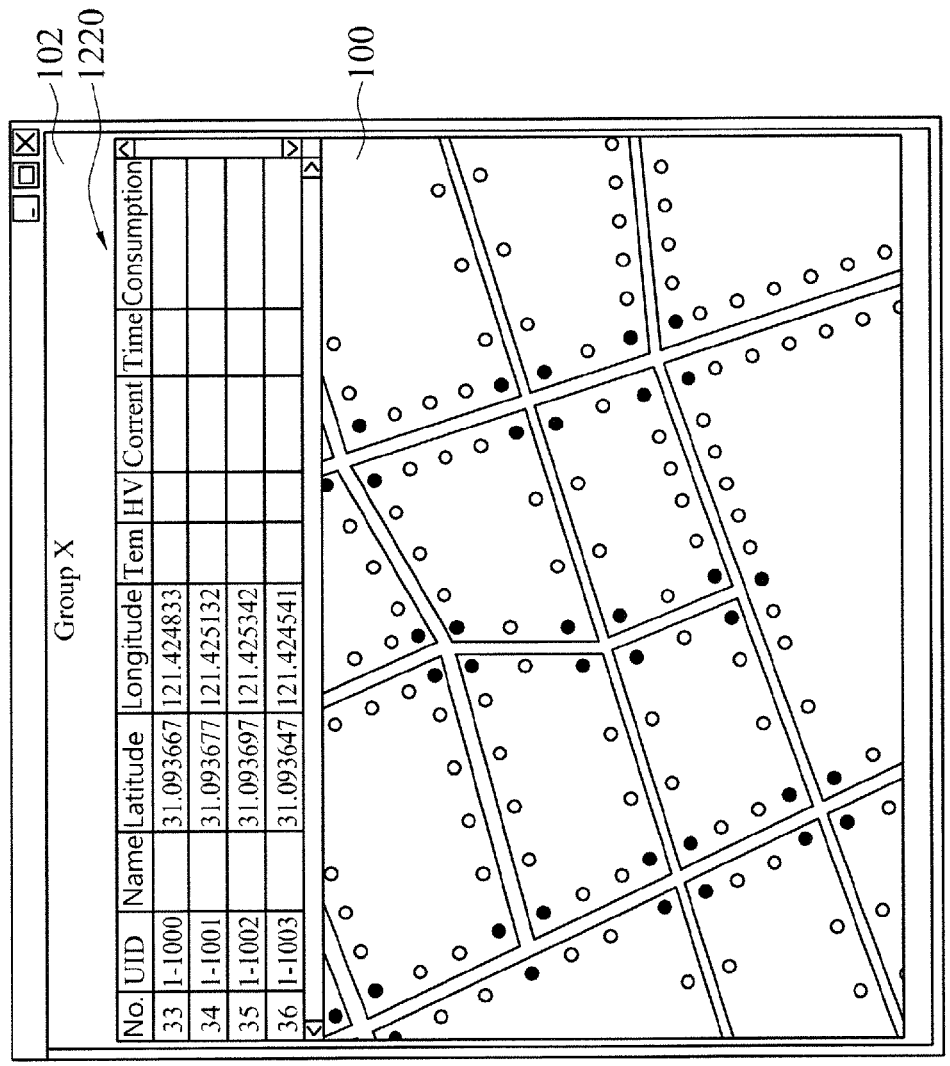
FIG. 4 is another schematic view of interface in accordance with the first preferred embodiment of the present invention.
Figure 5:
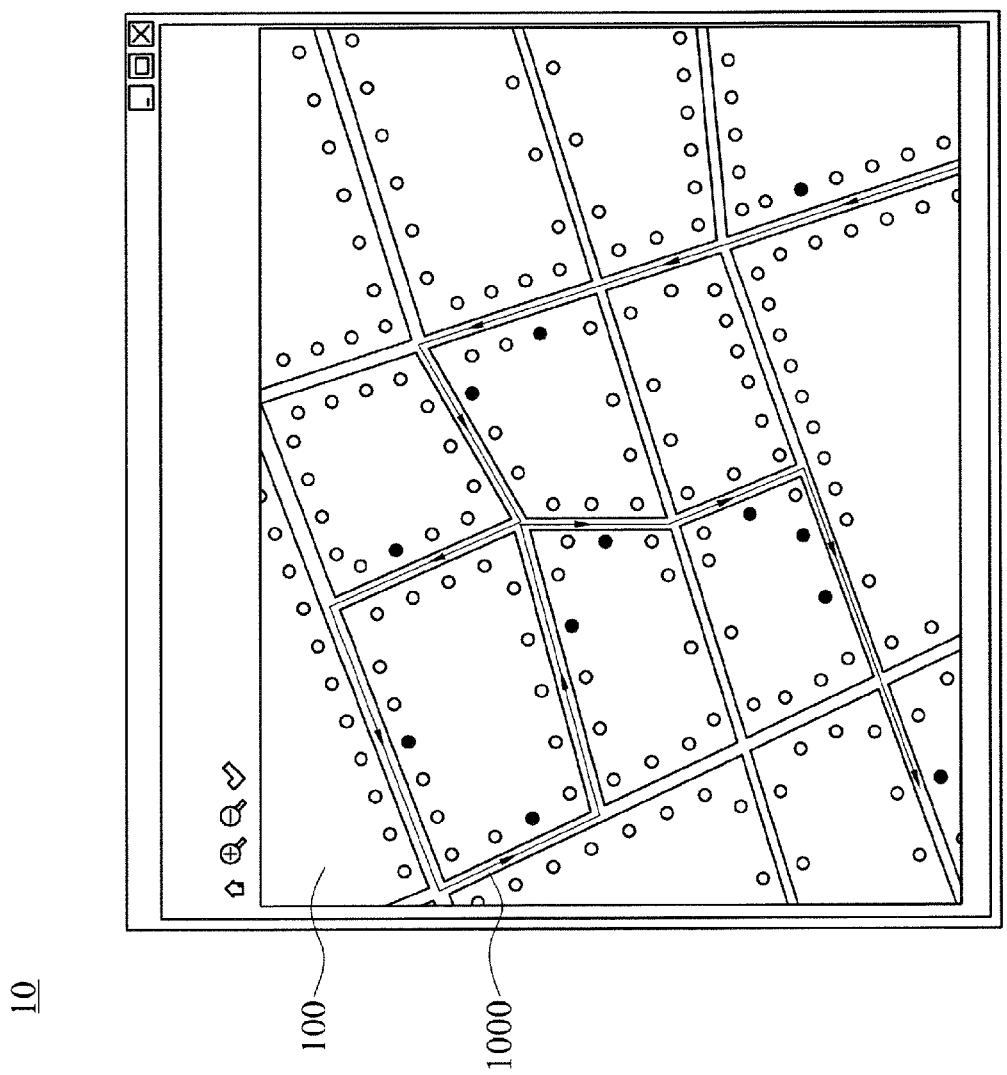
FIG. 5 is one more schematic view of interface in accordance with the first preferred embodiment of the present invention.

The technical contents of the present invention will become apparent with the detailed description of preferred embodiments and the illustration of related drawings as follows.

With reference to FIGS. 1 to 5 for a block diagram and various schematic views of application and interface in accordance with a first preferred embodiment of the present invention respectively, the outdoor device management system 1 is applied for monitoring an outdoor public equipment such as a road lamp, a street trash can, an electrical box, a monitor, a camcorder, a traffic light, an electric tower, an electric meter, a sprinkler or a switching box to improve the convenience and accuracy of the monitoring effect. The outdoor device management system 1 comprises a terminal device 10, a wireless sensor 11 and at least one outdoor device 12. The sensor 11 includes a GPS chip 110, and the sensor 11 can be a handheld device such as a camera, a camera phone or a tablet PC with the global positioning function. The outdoor device 12 includes an identification element 120, a transmission element 121 and a detection element 122, wherein the identification element 120 can be a 2D barcode or a 3D barcode and has a unique identifier address (UID) 1200 for identifying one or more data selected from the collection of model number, manufacturing date, service life, manufacturer code and serial number of the outdoor device 12. The detection element 122 detects the current situation including one or more data selected from the collection of temperature, current, voltage, working time and full storage rate of the outdoor device 12 to produce a detected value 1220 including the UID 1200, and the transmission element 121 is coupled to the detection element 122 for transmitting or receiving the detected value 1220 and other data with the terminal device 10 via the wireless network.

If the outdoor device 12 is an LED road lamp, the identification element 120 can be labeled at any position of the housing of the road lamp or on a wireless control device of the road lamp. The transmission element 121 and the detection element 122 can be integrated and electrically coupled to a central processing unit of the road lamp. When the outdoor device 12 is in installation process, the outdoor device management system 1 senses the outdoor device 12 by, the sensor 11 and takes the picture of the identification element 120 to identify the UID 1200 to produce sensed data 111, wherein the sensed data 111 includes coordinate data 1100 and be transmitted to the terminal device 10 via a 3G or WiFi wireless network, so that the terminal device 10 can analyze the sensed data 111 to mark the outdoor device 12 on a corresponding position in a map 100 according to the latitude and longitude of coordinate data 1100. Now, a manager can click any one of the outdoor devices 12 appeared on the map 100 through an operation interface of the terminal device 10 to modify the name, number or device information or define the operations such as the start time, end time or time for switching light intensity by oneself, so that the terminal device 10 can transmit an operation instruction 101 to the corresponding outdoor device 12 based on the UID 1200, and the transmission element 121 triggers the outdoor device 12 to control a corresponding operation. It is noteworthy that the sensor 11 includes a storage medium for storing the sensed data 111 and allowing the transmission of the sensed data 111 to the terminal device 10 through the transmission line in an offline mode.

In this preferred embodiment, plural outdoor devices 12 are used, and the manager divides each of the outdoor devices 12 into a group 102 through the terminal device 10 and defines the operation instruction 101 corresponding to each group to control an operation method of the outdoor devices 12 in an area or having the same operation. For example, in an divided area, 36 LED road lamps installed at an intersection are divided into a group X, wherein the operation instruction 101 is set to operate from 6:00 PM to 6:00 AM, light at 100% intensity during the period of 6:00 PM-10:00 PM and 70% intensity during the period of 10:00 PM-6:00 AM. In addition, 20 LED road lamps installed along both sides of a road section are divided into another group, and the operation instruction 101 is set to operate from 7:00 PM to 5:00 AM and light at 70% intensity.

In addition, the detection element 122 feeds back the detected value 1220 including the temperature (Tem.), highest voltage (HV), current and continuous working time (Time) of the outdoor device 12 to the terminal device 10, and the detected values 1220 are compiled and analyzed to obtain the power consumption, using time and service life information of the road lamps. In the meantime, the detected values 1220 are displayed on an operation interface to facilitate managers to control the current situation of the devices immediately and discover any possible problems at the earliest time for the troubleshooting and avoid failure or damage as early as possible. If the terminal device 10 analyzes and finds the detected value 1220 abnormal, the map 100 can be used for planning an optimal path 1000 to expedite the process for going to the location of the outdoor device 12 having problems, so as to provide a better service quality of the devices.

Figure 6:
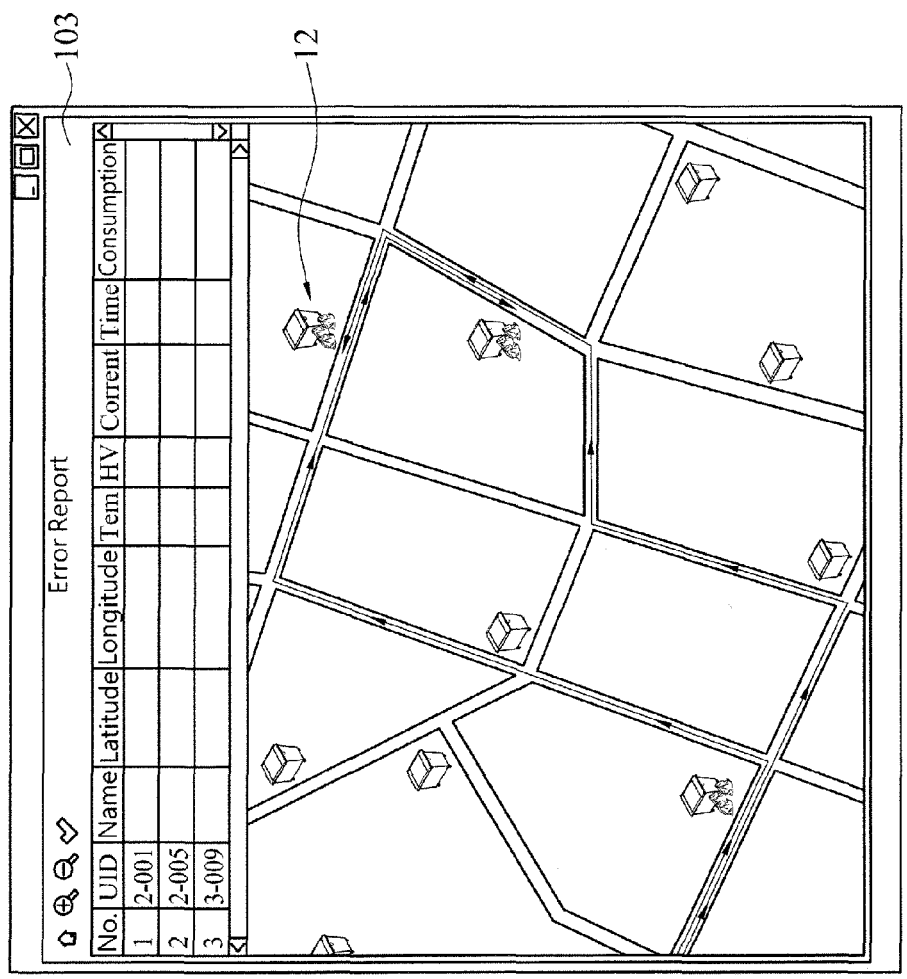
FIG. 6 is a schematic view of application in accordance with the second preferred embodiment of the present invention.

With reference to FIG. 6 for a schematic view of application in accordance with a second preferred embodiment of the present invention, if the outdoor device 12 is a street trash can, the detection element 122 is an infrared detector for detecting the full storage rate of the trash can, and issues and feeds back the abnormal detected value 1220 while the storage rate of the trash reaching 80%, so that the terminal device 10 will output a warning signal 103 and the optimal path 1000 to immediately notice the manager to request a staff on duty nearby to expedite the troubleshooting process.

What is claimed is:

1. An outdoor device management system, applied for monitoring at least one outdoor device including a road lamp, a street trash can, an electrical box, a monitor, an electric meter or a sprinkler by a terminal device to improve the convenience and accuracy of monitoring process, characterized in that the outdoor device comprises an identification element and a transmission element; the outdoor device management system senses the outdoor device by a wireless sensor with a global positioning system (GPS) chip, captures a unique identifier address (UID) of the identification element to form sensed data and then transmits the sensed data to the terminal device; the terminal device analyzes the sensed data packed with coordinate data to mark the outdoor device on a corresponding position in a map based on the coordinate data, and transmits an operation instruction to the corresponding outdoor device based on the UID to trigger the outdoor device through the transmission element for operation control; the outdoor device further comprises a detection element for detecting current status to form a detected value containing the UID and then transmits the detected value to the terminal device via a wireless network by the transmission element; analyzing and finding the detected value is abnormal, the terminal device uses the map to plan an optimal path for expediting the process of going to the location to maintain the outdoor device.

2. The outdoor device management system of claim 1, wherein the identification element is a 2D barcode or a 3D barcode.

3. The outdoor device management system of claim 2, wherein the sensor is a camera or a camera phone with a global positioning function.

4. The outdoor device management system of claim 3, wherein the UID contains model number, service life and manufacturer data of the outdoor device.

5. The outdoor device management system of claim 1, wherein if plural outdoor devices are used, the terminal device divides each of the outdoor devices into a group and defines the operation instruction corresponding to each group to control a start time, an end time and an operation method of the outdoor devices.

6. The outdoor device management system of claim 1, wherein the detected value includes one or more selected from the collection of temperature, current, voltage, working time and full storage rate of outdoor device.

7. The outdoor device management system of claim 1, wherein the terminal device outputs a warning signal when the detected value is abnormal.

8. The outdoor device management system of claim 1, wherein the sensor instantly transmits the sensed data to the terminal device via a wireless network.

\* \* \* \* \*